(12) United States Patent
Kenyon et al.

(10) Patent No.: US 8,661,782 B2
(45) Date of Patent: Mar. 4, 2014

(54) ROTATING VALVE ASSEMBLY FOR HIGH TEMPERATURE AND HIGH PRESSURE OPERATION

(75) Inventors: Ross Hartley Kenyon, Waterford, NY (US); Narendra Digamber Joshi, Schenectady, NY (US); Adam Rasheed, Glenville, NY (US); Mark Joseph Pombles, Highland Heights, KY (US)

(73) Assignee: General Electric Company, Niskayuna, NY (US)

( * ) Notice: Subject to any disclaimer, the term of this patent is extended or adjusted under 35 U.S.C. 154(b) by 1129 days.

(21) Appl. No.: 12/627,640

(22) Filed: Nov. 30, 2009

(65) Prior Publication Data

US 2011/0127456 A1  Jun. 2, 2011

(51) Int. Cl.
*F02C 5/02* (2006.01)
*F02C 5/10* (2006.01)

(52) U.S. Cl.
USPC ............................................ 60/247; 60/39.38

(58) Field of Classification Search
USPC .............................. 60/39.76, 247, 39.38, 725, 60/39.34–39.35; 137/625.31, 625.32; 431/1
See application file for complete search history.

(56) References Cited

U.S. PATENT DOCUMENTS

| 3,747,579 | A | | 7/1973 | Altmann | |
|---|---|---|---|---|---|
| 4,778,150 | A | | 10/1988 | Pratt et al. | |
| 5,181,580 | A | * | 1/1993 | Burg | 180/116 |
| 5,472,009 | A | * | 12/1995 | Linderoth | 137/101 |
| 2004/0123582 | A1 | * | 7/2004 | Norris et al. | 60/39.38 |
| 2004/0206403 | A1 | * | 10/2004 | Saitou et al. | 137/539 |
| 2007/0227150 | A1 | * | 10/2007 | Alkabie et al. | 60/754 |
| 2009/0139199 | A1 | * | 6/2009 | Kenyon et al. | 60/39.39 |

* cited by examiner

*Primary Examiner* — Andrew Nguyen
(74) *Attorney, Agent, or Firm* — John P. Darling

(57) ABSTRACT

A rotating valve assembly includes an inner cup having at least one inlet port; an outer cup having at least one inlet port, the outer cup rotatably mounted concentric with the inner cup by a bearing arrangement; and a cooling system located between the inner cup and the bearing arrangement for providing a thermal barrier between the inner cup and the bearing arrangement. The valve assembly also includes a labyrinth sealing arrangement located around the at least one inlet port of one of the inner and outer cups for preventing leakage of pressure waves generated by detonations or quasi-detonations within a combustion chamber of the inner cup.

20 Claims, 2 Drawing Sheets

ROTATING VALVE ASSEMBLY FOR HIGH TEMPERATURE AND HIGH PRESSURE OPERATION

CROSS-NOTING TO RELATED APPLICATIONS

This application is related to application Ser. No. 12/271,082, filed on Nov. 14, 2008, entitled "PULSE DETONATION COMBUSTOR VALVE FOR HIGH TEMPERATURE AND HIGH PRESSURE OPERATION," the entire contents of which are incorporated herein by reference.

BACKGROUND OF THE INVENTION

This invention relates to pulse detonation systems, and more particularly, to a rotating valve for high temperature and high pressure operation in a pulse detonation combustor.

With the recent development of pulse detonation combustors (PDCs) and engines (PDEs), various efforts have been underway to use PDC/Es in practical applications, such as in aircraft engines and/or as means to generate additional thrust/propulsion. Further, there are efforts to employ PDC/E devices into "hybrid" type engines, which use a combination of both conventional gas turbine engine technology and PDC/E technology in an effort to maximize operational efficiency. Other examples include use in aircrafts, missiles, and rockets.

Pulse detonation combustors are used, for example, in pulse detonation engines. In pulse detonation engines, thrust is generated by the supersonic detonation of fuel in a detonation chamber. The supersonic detonation wave increases the pressure and temperature in the detonation chamber until it is released resulting in thrust. As with any engine that intakes air, inlet stability is an important aspect of maintaining proper operation of a pulse detonation engine. This presents a particular challenge in pulse detonation engines, which use open inlet tubes.

The operation of pulse detonation engines creates extremely high-pressure peaks and oscillations within the combustor that may travel to upstream components, and generates high heat within the combustor and surrounding components resulting in damage and malfunction of the upstream components. Consequently, various valve techniques are being developed to provide inlet control and prevent the high-pressure peaks from traveling to the upstream components.

Because of the recent development of PDCs and an increased interest in finding practical applications and uses for these devices, there is an increasing interest in increasing their operational and performance efficiencies, as well as incorporating PDCs in such a way so as to make their use practical.

In some applications, attempts have been made to replace standard combustion stages of gas turbine engines with a single PDC. However, it is known that the operation of PDCs creates extremely high-pressure peaks and oscillations both within the PDC and upstream components, as well as generating high heat within the PDC tubes and surrounding components. Because of these high temperatures and pressure peaks and oscillations during PDC operation, it is difficult to develop operational systems, which can sustain long-term exposure to these repeated high temperature and pressure peaks/oscillations.

Further, because of the need to block the pressure peaks from upstream components, various valving techniques are being developed to prevent high pressure peaks from traveling upstream to the compressor stage. However, because of the frequencies, pressures and temperatures experienced from PDC operation the use of traditional valving is insufficient. Inadequate valving can cause unsteady pressure oscillations that can cause less than optimal compressor operation.

In addition, high reliability and long life (5000 to 10000 hrs life) for commercial applications is a challenge for PDE applications and has not yet been demonstrated.

Therefore, there exists a need for an improved method of implementing PDCs in turbine based engines and power generation devices, which address the drawbacks discussed above.

SUMMARY OF THE INVENTION

In one aspect of the invention, a rotating valve assembly comprises an inner cup having at least one inlet port; an outer cup having at least one inlet port, the outer cup rotatably mounted concentric with the inner cup by a bearing arrangement; and a cooling system located between the inner cup and the bearing arrangement for providing a thermal barrier therebetween.

In another aspect of the invention, a rotating valve assembly comprises an inner cup having at least one inlet port; an outer cup having at least one inlet port, the outer cup rotatably mounted concentric with the inner cup by a bearing arrangement; and a sealing arrangement located around the at least one inlet port of one of the inner and outer cups for preventing leakage of pressure waves generated by detonations or quasi-detonations of the rotating valve assembly.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

Figure 1:
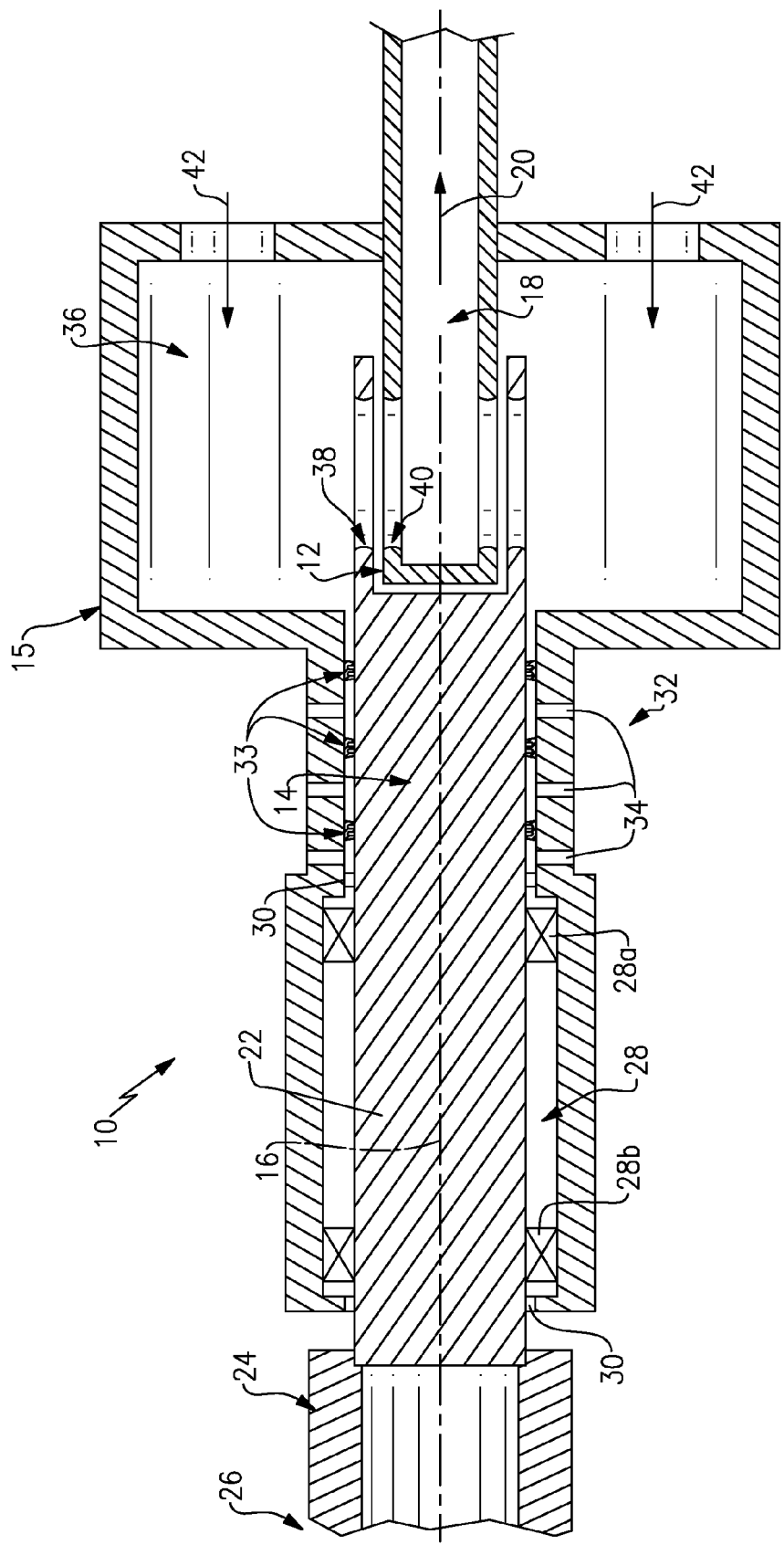
FIG. 1 is a cross-sectional view of a rotating valve assembly according to an exemplary embodiment of the invention.

As used herein, a "pulse detonation combustor" (PDC) is understood to mean any device or system that produces both a pressure rise and velocity increase from a series of repeated detonations or quasi-detonations within the device. A "quasi-detonation" is a supersonic turbulent combustion process that produces a pressure rise and velocity increase higher than the pressure rise and velocity increase produced by a deflagration wave. Embodiments of PDCs include a means of igniting a fuel/oxidizer mixture, for example a fuel/air mixture, and a detonation chamber, in which pressure wave fronts initiated by the ignition process coalesce to produce a detonation or quasi-detonation. Each detonation or quasi-detonation is initiated either by external ignition, such as spark discharge or laser pulse, or by gas dynamic processes, such as shock focusing, auto ignition or by another detonation (i.e. cross-fire). PDCs are used in pulse detonation engines (PDEs), for example. As used herein, "engine" means any device used to generate thrust and/or power. As used herein, "detonation" means either a detonation or a quasi-detonation.

Embodiments of the present invention will be explained in further detail by making reference to the accompanying drawings in which like reference numerals indicate corresponding parts. The drawings do not limit the scope of the invention in any way.

Figure 2:
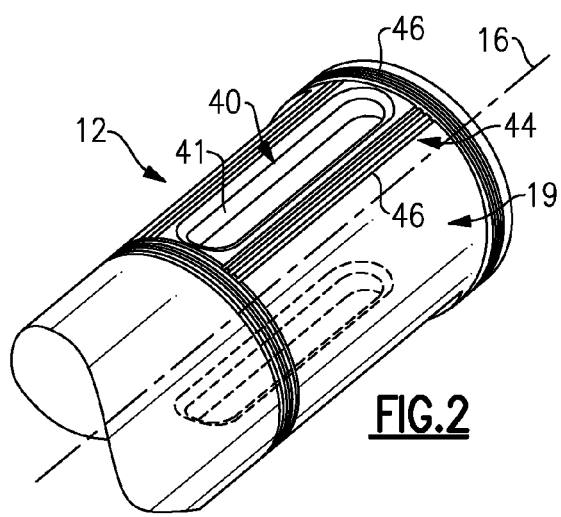
FIG. 2 is a perspective view of an inner cup of the rotating valve assembly according to an exemplary embodiment of the invention.

Referring now to FIG. 1, a rotating valve assembly is shown generally at 10 according to an embodiment of the invention. The valve assembly 10 includes an inner cup 12 that is concentric with an annular rotating outer cup 14 about a central axis 16. Detonations or quasi-detonations occur within a combustion chamber 18 of the inner cup 12 that travel in the direction of the arrow 20 to provide thrust and/or work energy out of a downstream of the inner cup 12. In one embodiment, an outer surface of the inner cup 12, an inner surface of the outer cup 14, or both, has a thin coating 19 (FIG. 2). The purpose of the thin coating 19 is to provide an abradable surface or a low-friction surface and to prevent possible damage to the valve assembly 10 in case the inner cup 12 and the outer cup 14 briefly contact each other.

To rotate the outer cup 14, the outer cup 14 is coupled to a drive means that includes a shaft 22 operably coupled to a drive coupling 24, which in turn, is operably coupled to a motor 26. In one embodiment, the motor 26 comprises a dc servomotor with a maximum power of about 5 hp, depending on the application. To facilitate rotation of the outer cup 14, the outer cup 14 is rotatably mounted on a housing member 15 using a bearing arrangement 28 of a type well-known in the art. In the illustrated embodiment, the bearing arrangement 28 comprises a ball bearing arrangement that includes a first roller ball and track 28a and a second roller ball and track 28b. As shown in FIG. 1, the first roller ball and track 28a is closer to the detonations generated in the inner cup 12 than the second roller ball and track 28b. The first and second roller ball and tracks 28a, 28b can be designed for the same or different bearing loads. For example, the bearing arrangement 28 can be designed for about 50-200 lbs of radial load and about 500-1500 lbs of axial load on the shaft. Although a well-known roller ball and track arrangement is shown in the illustrated embodiment, it will be appreciated that the outer cup 14 can be rotatably mounted using any other well-known means in the art. For example, the roller bearing arrangement 28 may comprise air-bearings, magnetic bearings, and the like.

The valve assembly 10 also includes a cooling system, shown generally at 32, located between the inner cup 12 and the bearing arrangement 28. The cooling system 32 includes one or more inlet and/or outlet ports 34 to introduce a cooling medium (not shown), such as air, and the like, into the valve assembly 10 and to exhaust warmer air from the cooling system 32. It will be understood that the primary source of heat in the valve assembly 10 is from the inlet air 42 entering the housing 15. In some embodiments, the inlet air 42 may have a temperature of between about 500° F. and about 900° F. It will also be understood that high temperatures are generated by the detonations or quasi-detonations occurring in the inner cup 12. The purpose of the cooling system 32 is to provide a thermal barrier between the inner cup 12 and the bearing arrangement 28. The cooling system 32 being located between the inner cup 12 and the bearing arrangement 28 greatly reduces the transfer of heat from the inner cup 12 to the bearing arrangement 28, thereby prolonging the life of the bearing arrangement 28 and the valve assembly 10.

The cooling system 32 also includes a plurality of labyrinth seals 33 located between the inner cup 12 and the bearing arrangement 28. In addition, the labyrinth seals 33 are located between each of the inlet/outlet ports 34 of the cooling system 32 to form chambers for the flow of fluid to/from the valve assembly 10.

The valve assembly 10 further includes a plurality of seals 30, such as grease lip seals, and the like, to seal the housing 15 and the shaft 22 (or outer cup 14) at appropriate locations along the housing member 15. The purpose of the seals 30 is to seal the pressurized inlet air 42 within the plenum 36 and to prevent contamination of the bearing arrangement 28. In addition, at least one seal 30 is located between the inner cup 12 and the bearing arrangement 28, and in more particular, between the cooling system 32 and the bearing arrangement 28 to further provide a thermal barrier from the heat generated in the inner cup 12 during operation and the heat from the inlet air 42.

The valve assembly 10 also includes a plenum 36 between the housing 15 and the outer cup 14 that introduces air (or any oxidizer) through at least one inlet port 38 of the rotating outer cup 14, through at least one inlet port 40 of the inner cup 12, and into the combustion chamber 18. The valve assembly 10 is designed for temperatures and pressures generated by a compressor of a gas turbine engine. For example, the valve assembly 10 can be designed for inlet air temperatures of about 500-1000° F. and pressures of about 5-30 atm. It is desirable that the plenum 36 has a volume of about two to three times the volume of the inner cup 12 and combustion chamber (not shown). As a consequence, the plenum 36 has a Helmholtz resonance frequency less than about 10 Hz, which is less than the lowest operating frequency of the inner cup 12 so that cavity oscillations do not affect fill of the inner cup 12 with inlet air 42.

Figure 3:
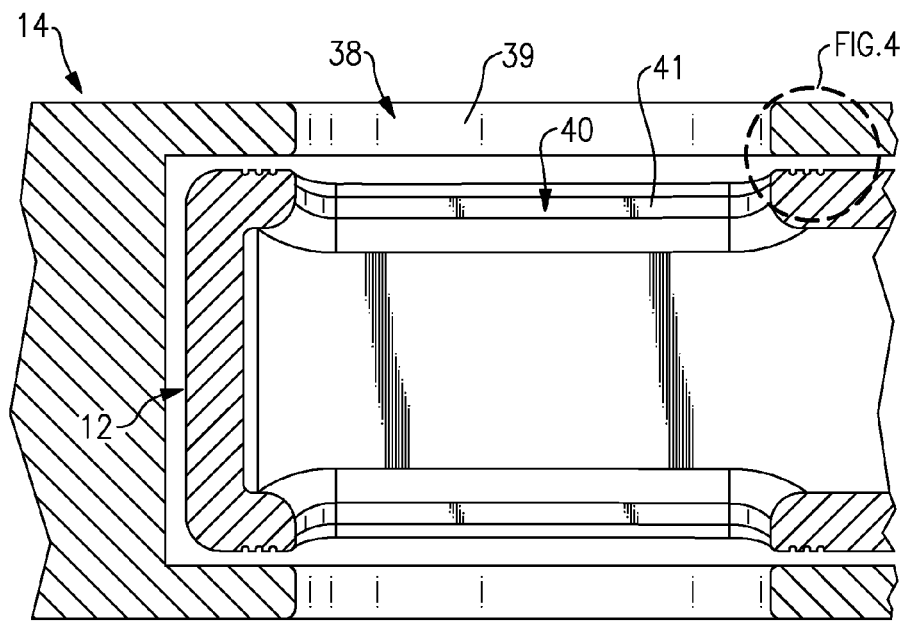
FIG. 3 is a cross-sectional view of the inner cup taken along line 3-3 of FIG. 2.

In an exemplary embodiment, the inner cup 12 and the outer cup 14 include two inlet ports 38, 40 separated from each other by about 180 degrees that repeatedly radially align with one another during rotation of the outer cup 14 such that the inlet ports 38, 40 radially align with each other twice for each complete rotation of the outer cup 14. This radial alignment allows for air flow (or any oxidizer) in the direction of arrows 42 to enter the plenum 36, pass through the inlet ports 38, 40, and into the chamber 18. Thus, during at least the purge and fill stages of PDC operation, the inlet ports 38, 40 are radially aligned with each other to allow for the flow of oxidizer and/or fuel into the chamber 18. Then, as the inlet port 38 of the rotating outer cup 14 passes the inlet port 40 of the inner cup 12, the inner cup 12 and the chamber 18 become closed, so that a detonation or a quasi-detonation may occur within the chamber 18. Thus, during operation, the rotational speed of the outer cup 14 is selected such that at the completion of the fill stage, the chamber 18 becomes closed, at which time a detonation (and/or quasi-detonation) occurs within the chamber 18 and the detonation wave (and/or quasi-detonation wave) of combusted fuel/air mixture travels in the chamber 18 in the direction of the arrow 20. In one embodiment, the outer cup 14 rotates at a rotational speed of between about 1200 rpm to about 1800 rpm. The overall shape and size of the inlet ports 38, 40 are optimized based on design and performance parameters for the desired valve timing. As seen in FIG. 3, the walls 39, 41 of the inlet ports 38, 40 have a rounded contour to improve air flow through the inlet ports 38, 40.

Figure 4:
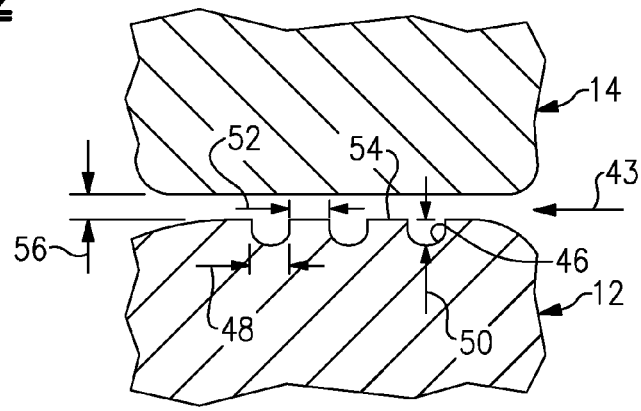
FIG. 4 is an enlarged cross-sectional view of a labyrinth sealing arrangement of the inner cup shown in FIG. 3.

During operation, it is possible that pressure waves from detonations or quasi-detonations pass outward through inlet port 40 of the inner cup 12 and attempt to leak between the inner and outer cups 12, 14. Referring now to FIGS. 2-4, one aspect of the invention is that one of the inner and outer cups 12, or both, includes a sealing arrangement, shown generally at 44, surrounding the inlet port(s) 40. In one example, the sealing arrangement 44 may comprise a labyrinth sealing arrangement, as shown in the illustrated embodiment. The labyrinth sealing arrangement 44 provides a non-contact sealing action by controlling the passage of pressure waves through a pattern of chambers by centrifugal force, as well as by the formation of controlled fluid vortices.

In the illustrated embodiment shown in FIGS. 2-4, the chambers for the labyrinth sealing arrangement 44 comprise a pattern of grooves 46 arranged around the inlet port(s) 40 of the inner cup 12. As shown in FIG. 2, the pattern of grooves 46 completely encircles the inlet port(s) 40 of the inner cup 12. That is, the pattern of grooves 46 extends in a direction substantially parallel to the longitudinal axis 16 and substantially perpendicular to the longitudinal axis 16 so as to completely encircle or surround the inlet port(s) 40 of the inner cup 12. In an exemplary embodiment, the pattern of grooves 46 comprises three grooves in which each groove 46 has a width 48 of about 0.060 inches (1.524 mm) and a depth 50 of about 0.040 inches (1.016 mm). In other words, the aspect ratio of width/depth of each groove 46 is approximately 1.50 (0.060/0.040). The width 52 of the crest 54 (or teeth) between each groove 46 is approximately 0.020 inches (0.508 mm). The purpose of the labyrinth sealing arrangement 44 is to severely attenuate or prevent the pressure waves passing through the inlet port(s) 40 from leaking in the direction of the arrow 43, as shown in FIG. 4. This aspect ratio is unique because of space constraints associated with the inner and outer cup 12, 14. In the illustrated embodiment, any pressure wave has passed through the inlet port(s) 40 becomes entrapped in one or more grooves 46 where it is forced into a vortex-like motion. This vortex-like motion acts to prevent the escape of pressure waves, and also acts to repel any other pressure wave. It will be appreciated that the dimensions of the grooves 46 do not limit the invention, and that the invention can be practiced with any dimensions that adequately prevent the escape of pressure waves between the inner and outer cups 12, 14. As shown in FIG. 4, a gap 56 of about 0.012 inches (0.305 mm) exists between the inner cup 12 and the outer cup 14. Because the inner cup 12 does not contact the outer cup 14, the labyrinth seal arrangement 44 does not wear out.

As described above, the rotating valve assembly 10 of the invention provides improved cooling of the bearing arrangement 28 by locating the bearing arrangement 28 further away from the high temperatures located in the vicinity of the inner cup 12. In addition, the cooling system 32 is located between the inner cup 12 and the bearing arrangement 28 to provide a thermal barrier between the inner cup 12 and the bearing arrangement 28 and to prevent an undesirable increase of the temperature of the bearing arrangement 28. As a result, the overall lifetime of the valve assembly 10 is increased.

Further, the rotating valve assembly 10 of the invention provides improved sealing of the inlet port(s) 38, 40 of one or both of the inner and outer cups 12, 14. This is accomplished by providing the labyrinth sealing arrangement 44 having a plurality of grooves 46 that completely encircle or surround the inlet port(s) 38, 40 to provide a non-contact sealing action that controls the passage of pressure waves through the use of centrifugal force, as well as by the formation of controlled fluid vortices. As a result of this improved sealing, the overall lifetime of the valve assembly 10 is further increased.

Although a pulse detonation device is described above, it is noted that the invention is not limited to this specific device, and that the principles of the invention can be in any similar detonation/deflagration device in which the benefits of the invention are desirable.

While the invention has been described in terms of various specific embodiments, those skilled in the art will recognize that the invention can be practiced with modification within the spirit and scope of the claims.

What is claimed is:

1. A rotating valve assembly, comprising:
    an inner cup having at least one inlet port and a combustion chamber;
    an outer cup having at least one inlet port, the outer cup rotatably mounted concentric with the inner cup by a bearing arrangement; and
    a cooling system located between the inner cup and the bearing arrangement for providing a thermal barrier therebetween, the cooling system further comprising a plurality of axially spaced seals and at least one cooling port disposed between a pair of the axially spaced seals.

2. The rotating valve assembly according to claim 1, wherein the cooling system comprises a plurality of input cooling ports and output cooling ports for providing a cooling medium to the rotating valve assembly.

3. The rotating valve assembly according to claim 1, further comprising a sealing arrangement located around the at least one inlet port of one of the inner and outer cups for preventing leakage of pressure waves generated by detonations or quasi-detonations within the combustion chamber of the inner cup.

4. The rotating valve assembly according to claim 1, wherein one of an outer surface of the inner cup and an inner surface of the outer cup is an abradable surface in the form of a thin coating.

5. The rotating valve assembly according to claim 1, further comprising a gap between the inner cup and the outer cup.

6. The rotating valve assembly according to claim 1, wherein the inner cup and the outer cup include two inlet ports separated from each other by about 180 degrees that repeatedly radially align with one another during rotation of the outer cup such that the inlet ports radially align with each other twice for each complete rotation of the outer cup.

7. The rotating valve assembly according to claim 1, wherein the at least one inlet port of the inner cup has a rounded contour to improve air flow through the at least one inlet port.

8. The rotating valve assembly according to claim 1, wherein a plenum introduces an oxidizer through the at least one inlet port of the outer cup, through the at least one inlet port of the inner cup, and into the combustion chamber.

9. The rotating valve assembly according to claim 8, wherein the plenum has a volume that is greater than a volume of the inner cup.

10. The rotating valve assembly according to claim 8, wherein the plenum has a Helmholtz resonance frequency that is less than a lowest operating frequency of the inner cup.

11. A rotating valve assembly, comprising:
    an inner cup having at least one inlet port and a combustion chamber;
    an outer cup having at least one inlet port, the outer cup rotatably mounted concentric with the inner cup by a bearing arrangement, the at least one inlet port of the outer cup and the bearing arrangement disposed on opposite axial sides of the outer cup; and
    a sealing arrangement located axially between the inner cup and the bearing arrangement for preventing leakage of pressure waves generated by detonations or quasi-detonations within the combustion chamber of the inner cup.

12. The rotating valve assembly according to claim 11, wherein the sealing arrangement comprises a labyrinth sealing arrangement.

13. The rotating valve assembly according to claim 11, further comprising a gap between the inner cup and the outer cup.

14. The rotating valve assembly according to claim 11, further comprising a cooling system located between the inner cup and the bearing arrangement for providing a thermal barrier therebetween.

15. The rotating valve assembly according to claim 14, wherein the cooling system comprises a plurality of input ports and output ports for providing a cooling medium to the rotating valve assembly.

16. The rotating valve assembly according to claim 11, wherein the inner cup and the outer cup include two inlet ports separated from each other by about 180 degrees that repeatedly radially align with one another during rotation of the outer cup such that the inlet ports radially align with each other twice for each complete rotation of the outer cup.

17. The rotating valve assembly according to claim 11, wherein the at least one inlet port of the inner cup has a rounded contour to improve air flow through the at least one inlet port.

18. The rotating valve assembly according to claim 11, wherein a plenum introduces an oxidizer through the at least one inlet port of the outer cup, through the at least one inlet port of the inner cup, and into the combustion chamber of the inner cup.

19. The rotating valve assembly according to claim 18, wherein the plenum has a volume that is greater than a volume of the inner cup.

20. The rotating valve assembly according to claim 18, wherein the plenum has a Helmholtz resonance frequency that is less than a lowest operating frequency of the inner cup.

* * * * *